Aug. 29, 1933.  H. A. W. WOOD  1,924,583
QUICK CHANGE SPLICING DEVICE
Original Filed June 15, 1927  9 Sheets-Sheet 4
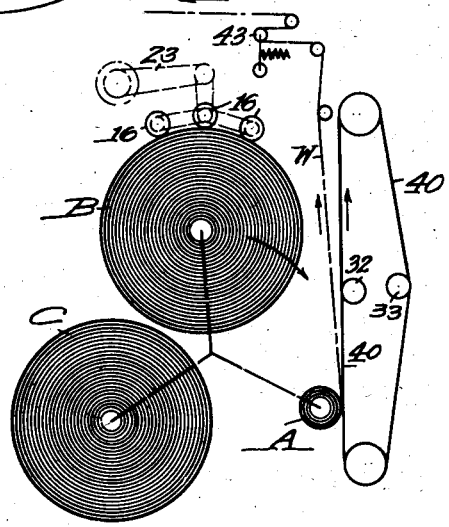
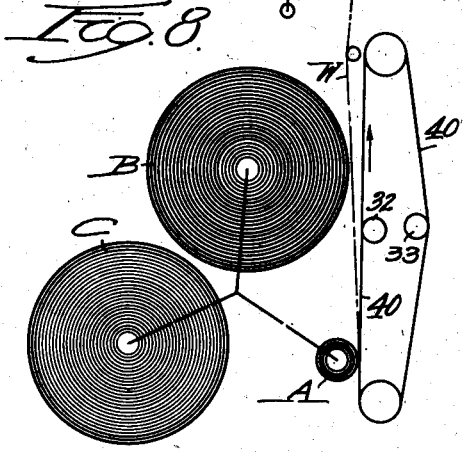
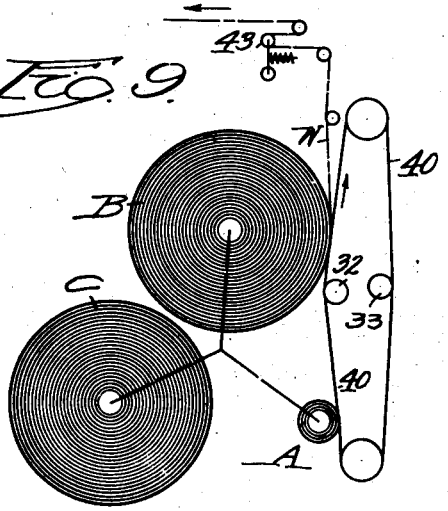
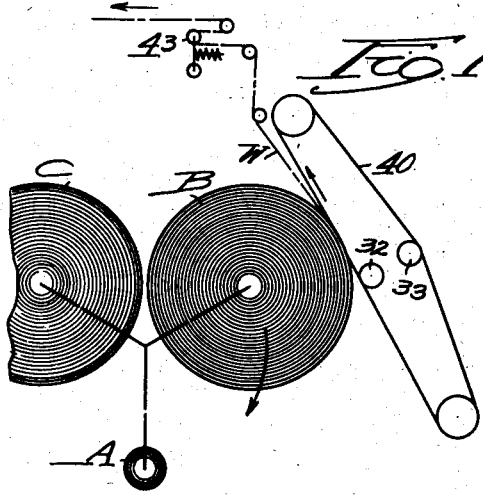

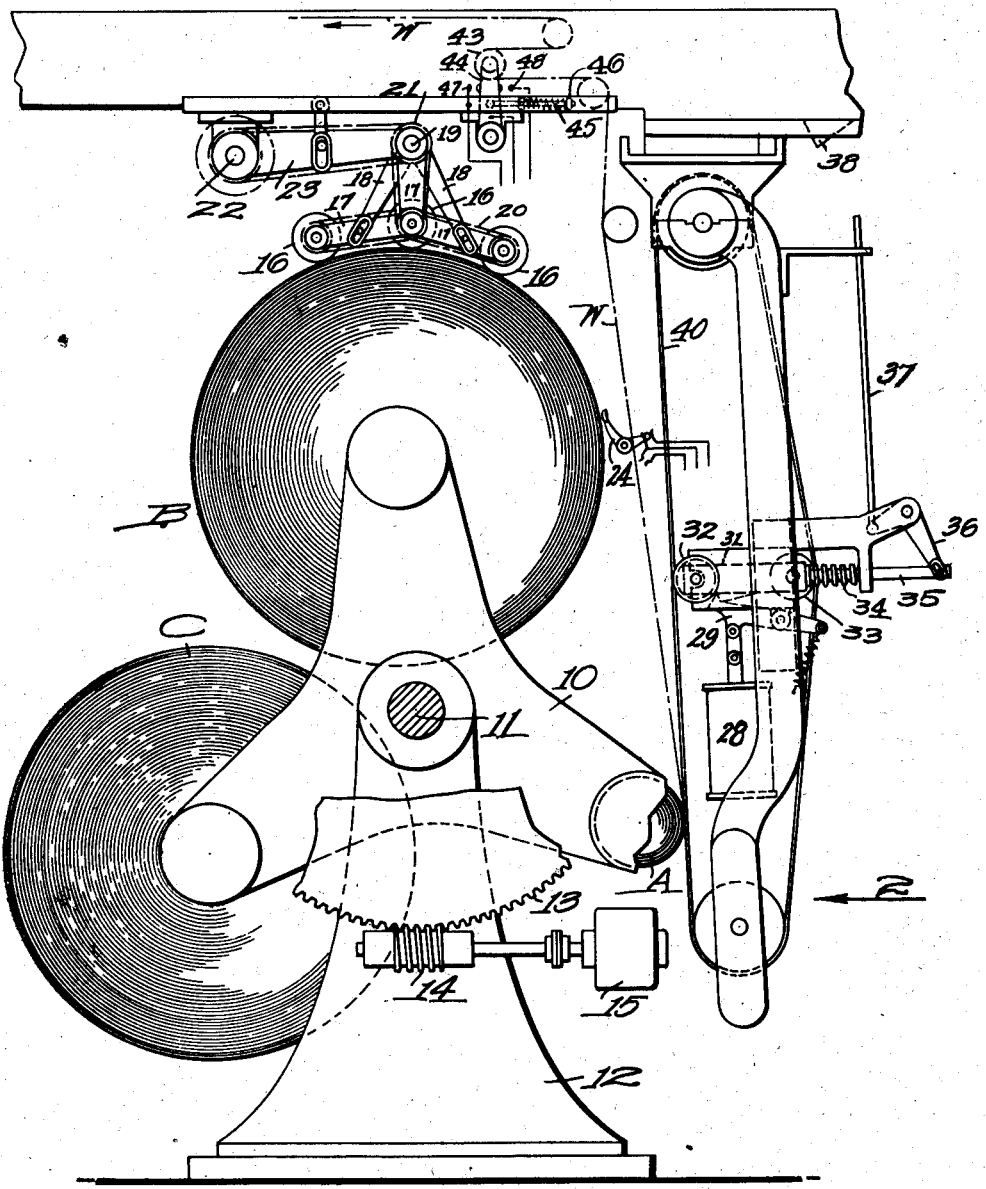

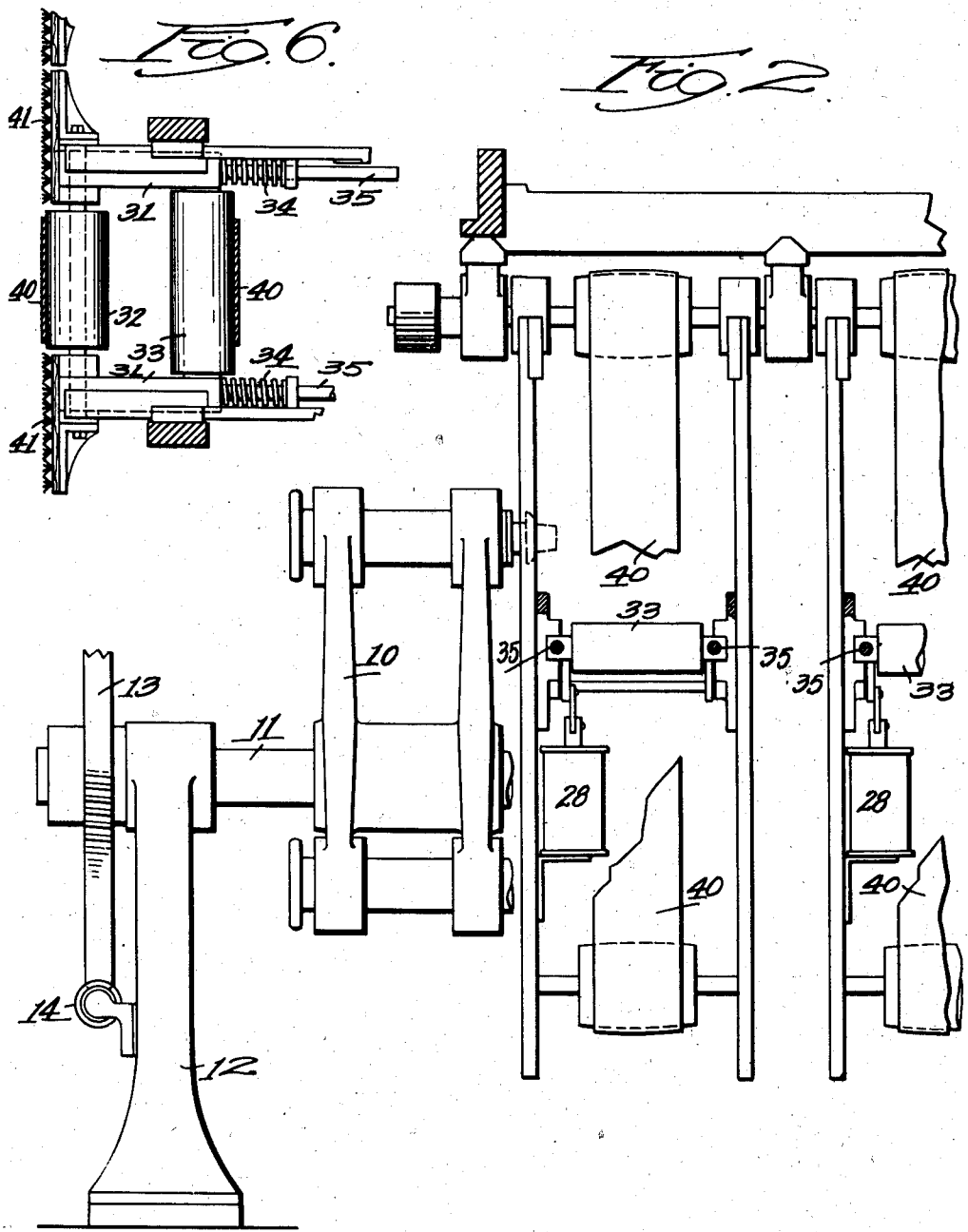

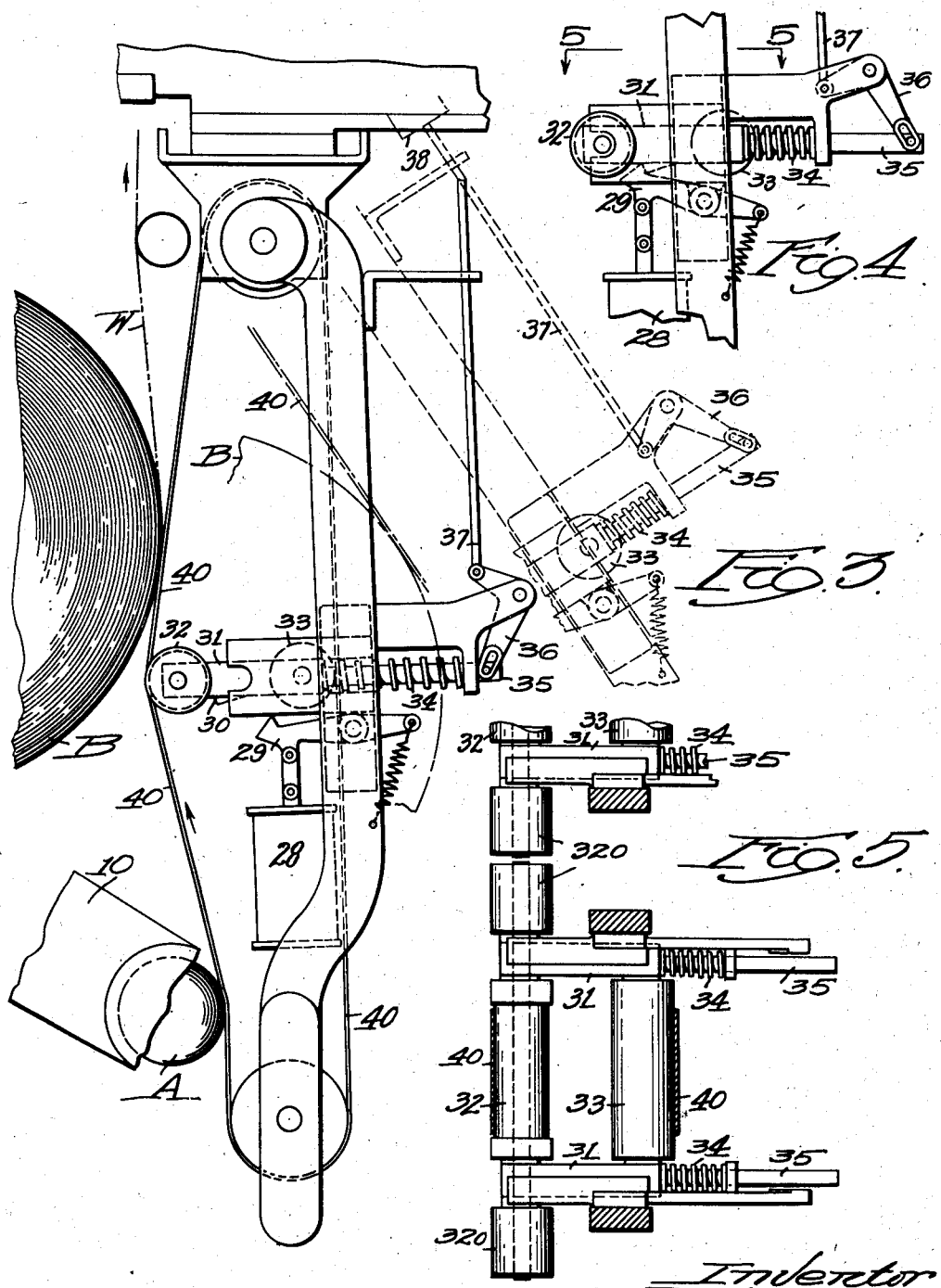

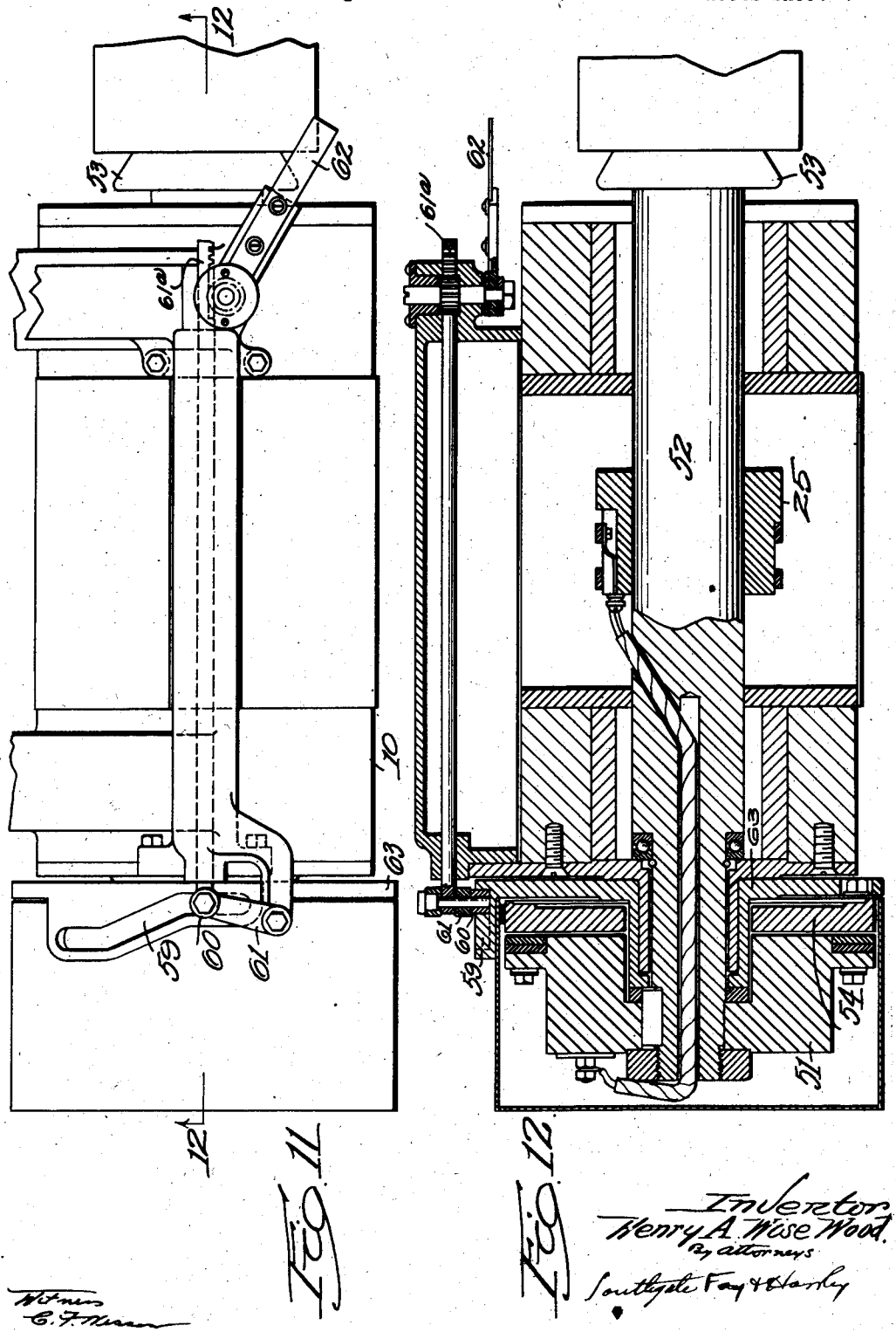

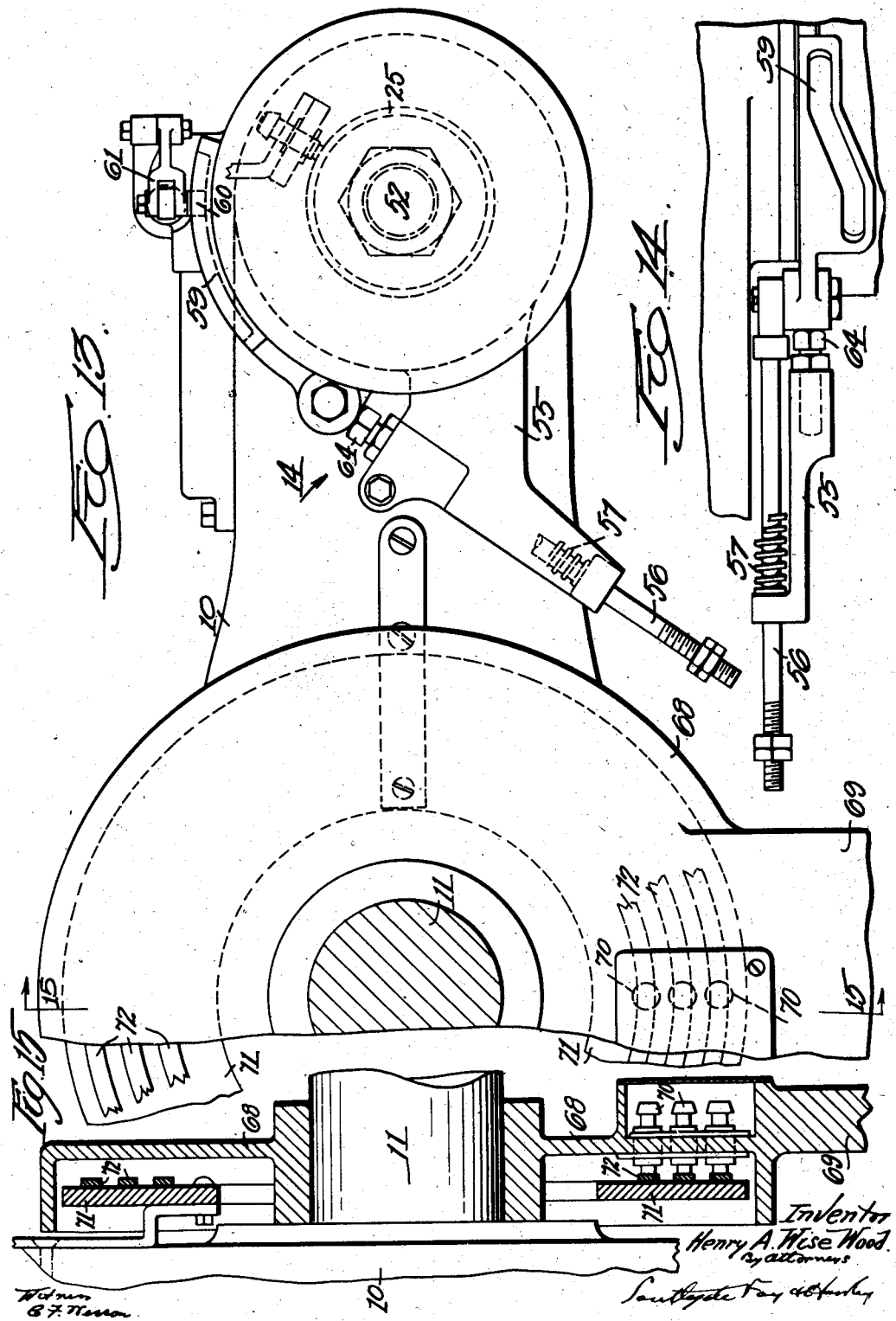

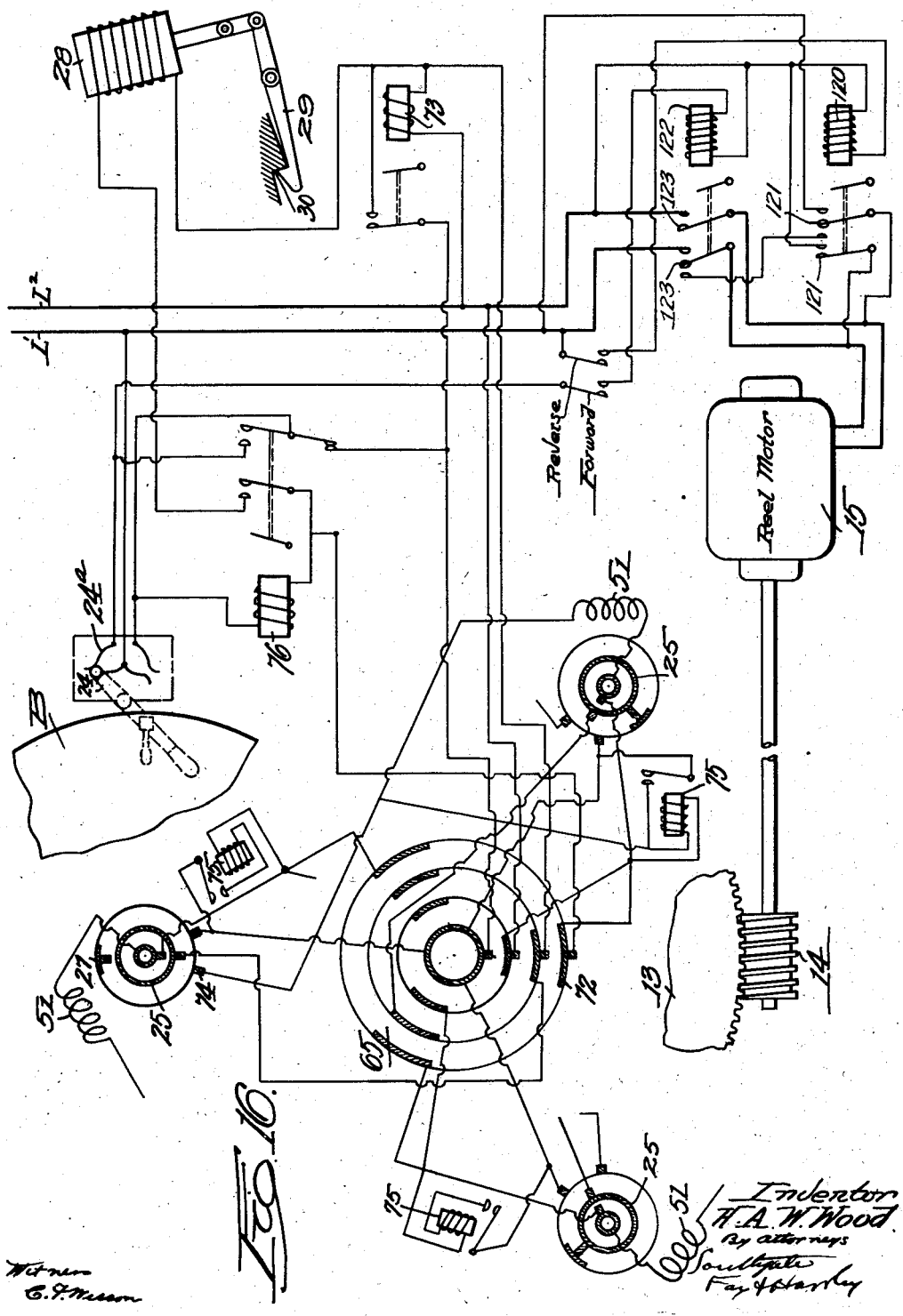

Aug. 29, 1933.  H. A. W. WOOD  1,924,583
QUICK CHANGE SPLICING DEVICE
Original Filed June 15, 1927   9 Sheets-Sheet 8
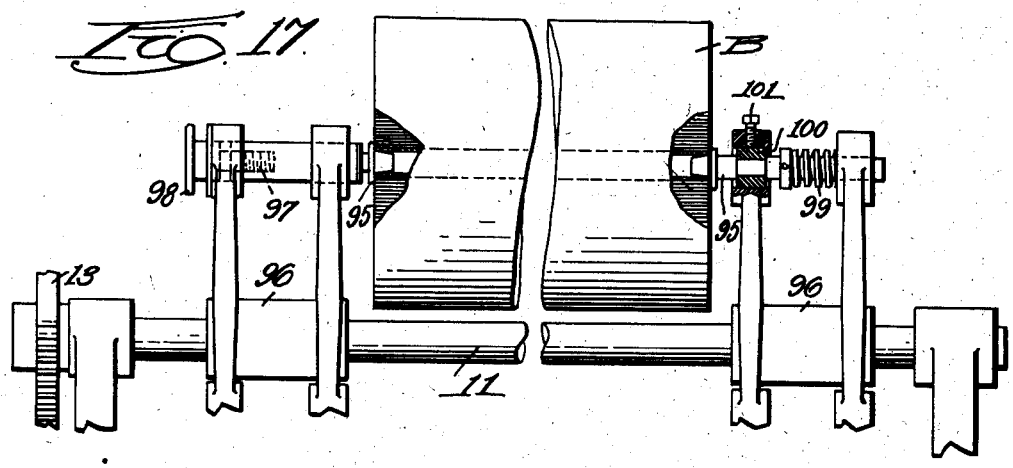
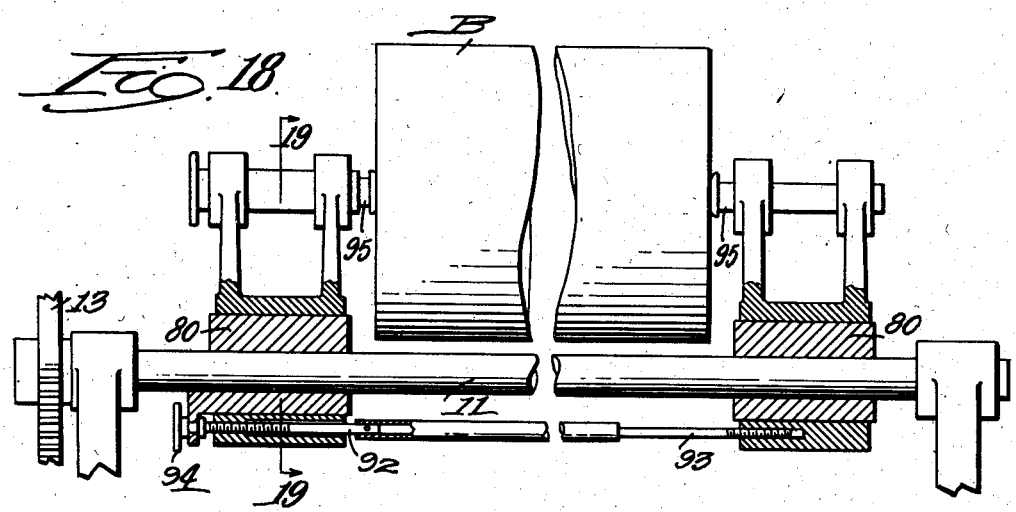
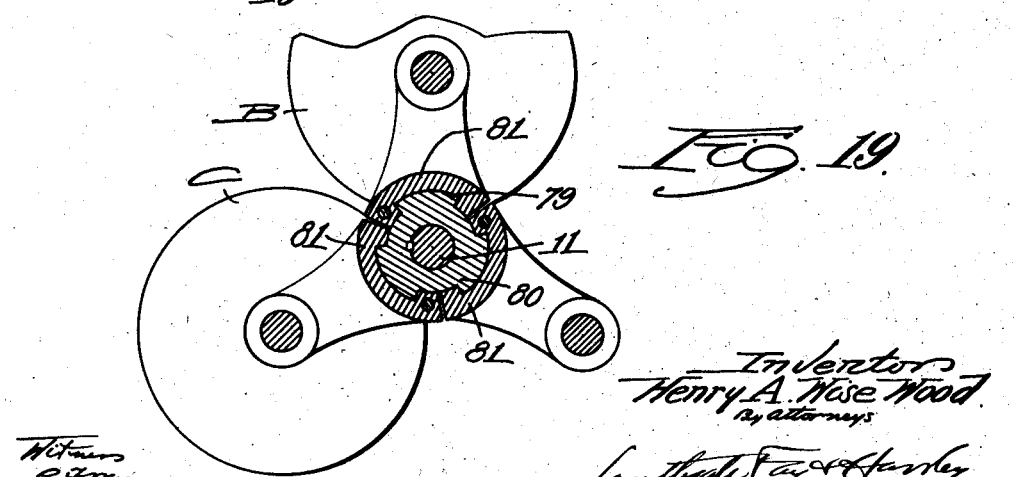

Aug. 29, 1933.  H. A. W. WOOD  1,924,583
QUICK CHANGE SPLICING DEVICE
Original Filed June 15, 1927  9 Sheets—Sheet 9
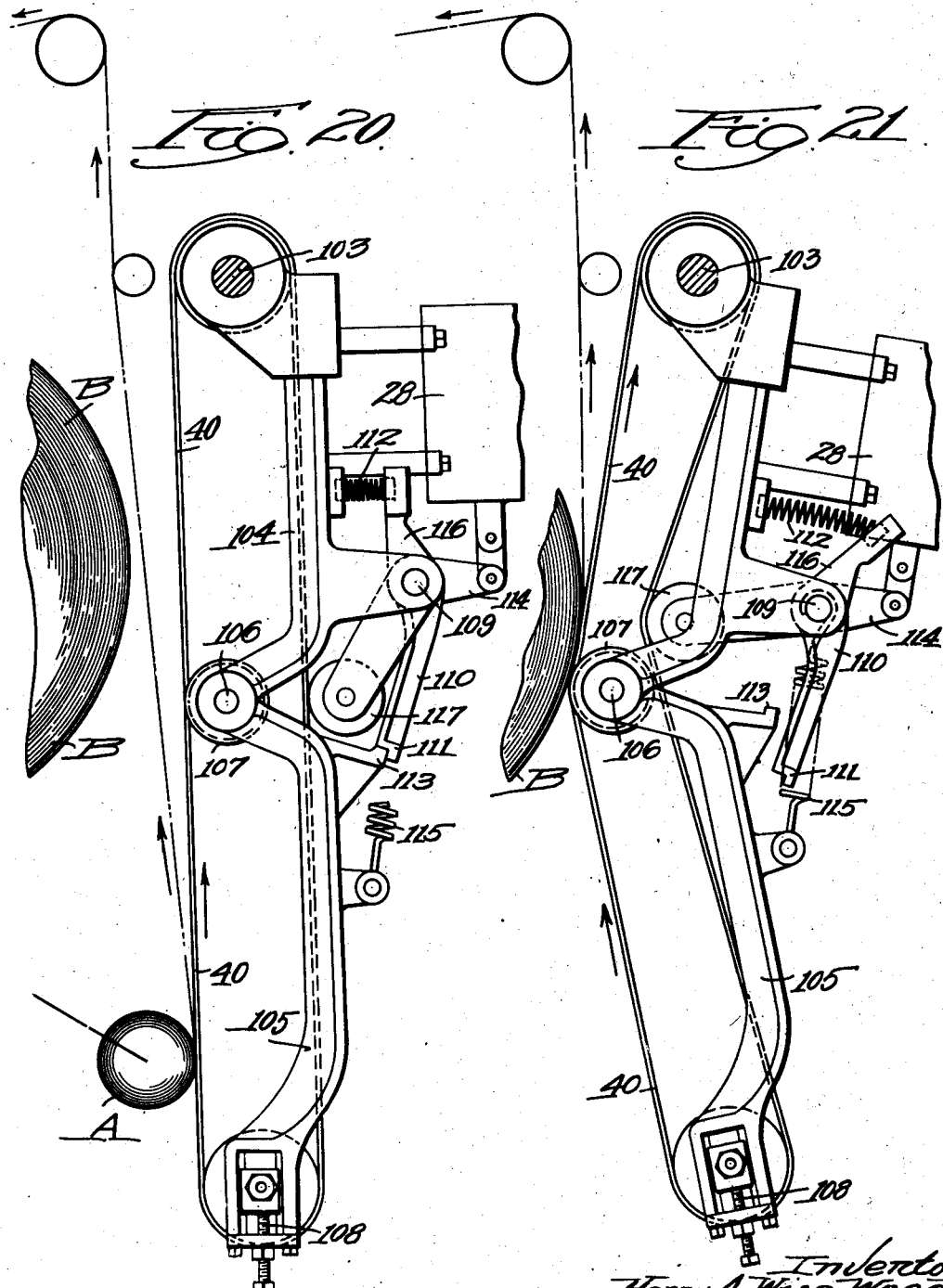

Patented Aug. 29, 1933

1,924,583

UNITED STATES PATENT OFFICE 1,924,583

QUICK CHANGE SPLICING DEVICE

Henry A. Wise Wood, New York, N. Y., assignor to Wood Newspaper Machinery Corporation, New York, N. Y., a corporation of Virginia Application June 15, 1927, Serial No. 198,981
Renewed January 11, 1933

18 Claims. (Cl. 242—58)

This invention relates to means in a printing press for splicing a pasted fresh web roll to the expiring end of a running web without retarding the running of the press.

The principal objects of the invention are to provide means for employing an existing element of a paster to press the expiring web against the fresh web roll to perform the pasting operation; to provide means whereby the rotation of the fresh roll to pasting position will operate the web feeding means so that that may itself be used for the pressing of the web against the web roll and the completing of the pasting operation; to provide a single means for feeding the running web roll and pressing the web against the fresh roll for performing the pasting operation, thus avoiding the use of separate elements for the latter purpose which would have to be moved out of the way when the reel or support for the web rolls was turned around to a position for the freshly connected roll to serve as the running roll; to provide means whereby, when the reel is rotated after the pasting operation is completed, so as to bring the new roll into proper running position, the web feeding belts will be brought automatically to the proper position for propelling the new running roll and keeping it up to web speed and preventing its moving faster than web speed throughout its run; to provide means for engaging the web across its entire width at the moment of pasting so that it will be uniformly supported all the way across at that instant; to provide an improved means for propelling the fresh roll up to web speed before it is brought into pasting position without the disadvantages of a belt or belts contacting with its surface for that purpose; to provide means for stopping the exhausted roll or butt automatically; to provide an automatic self-adjusting tension device for the web; to provide simplified automatic means for operating the severing knife cooperating with the means for stopping the butt of the exhausted roll; to provide electric and magnetic means to control the several operations above indicated, and to provide improved means for lining up the new roll with the running web by moving any one roll sidewise independent of the other.

Other objects and advantages of the invention will appear hereinafter.

Reference is to be had to the accompanying drawings in which

Fig. 1 is an end view of a web splicing machine comprising a preferred embodiment of this invention showing the parts in running position;

Fig. 2 is a front elevation of the same with the propelling belts broken away to show the construction in the interior;

Fig. 3 is a view similar to Fig. 1 on enlarged scale showing the parts in position for pasting;

Fig. 4 is a similar elevation of the latching mechanism shown in latched position;

Fig. 5 is a horizontal sectional view of the same on the line 5—5 of Fig. 4 showing this mechanism in plan;

Fig. 6 is a similar view of a modified form;

Figs. 7, 8, 9 and 10 are diagrammatic views showing different positions of the parts, Fig. 7 representing the position shown in Fig. 1 and Fig. 9 that shown in Fig. 3;

Fig. 11 is a plan on enlarged scale of a part of the reel showing a means for stopping the stub or butt of the expired web and the severing blade;

Fig. 12 is a central sectional view on the line 12—12 of Fig. 11;

Fig. 13 is an end view of the same mechanism;

Fig. 14 is an elevation looking in the direction of the arrow 14 in Fig. 13;

Fig. 15 is a sectional view on the line 15—15 of Fig. 13;

Fig. 16 is a wiring diagram for the machine;

Fig. 17 is an elevation of a part of the roll supporting reel illustrating the way of supporting one roll thereon;

Fig. 18 is a similar view showing in section a preferred form thereof comprising an adjusting mechanism for each pair of arms on the reel, independently;

Fig. 19 is a transverse sectional view on the line 19—19 of Fig. 18; and

Figs. 20 and 21 are end views showing a modified construction of the feed belt mechanism and illustrating the running position and pasting position respectively.

As stated, one purpose of this invention is to provide a quick change splicing device in which a surplus movable element, used for moving the running web into contact with the fresh web roll, is eliminated. The invention is shown in the first nineteen figures in a form in which the running web roll A, the fresh roll B and the spare roll C are mounted on the arms of a reel 10 fixed on a shaft 11 supported by a frame 12. Now this shaft as usual has a gear 13 operated by a worm 14 which is directly connected with a motor 15. This motor is wired up to turn this reel in such a manner as may be desired. As will appear, the operation of the connections for that purpose is automatically and electrically controlled throughout.

It is to be understood that the device operates when the running roll A is nearly exhausted as shown in Fig. 1, at which time the reel has rotated around to such position that the fresh roll B, pasted in the usual way, is in the position shown in that figure. When it reaches that point the roll B engages a switch 24, which disconnects the motor 15 from the power and stops the reel.

The fresh roll B is propelled by a series of propelling rollers 16 which are mounted on frames 17 loosely pivoted on arms 18 which in turn are pivoted on a stud or shaft 19. These rollers are connected with each other by belts 20 all of which are operated at the same speed from a pulley 21 on the shaft 19. This shaft is operated from the press through a shaft 22 and other belts and pulleys as will appear. The shaft 19 is mounted on a frame 23 which is freely movable up and down within certain limits. The weight of three sets of rollers 16 bears on the roll B. As they are rotated positively from the press and at a surface speed equal to that of the web, the roll B will be brought up to web speed while in the position shown in Fig. 1 and also in Fig. 7.

When the fresh roll, having been pasted and brought up to web speed, rotates on its own axis to the right point a commutator 25 on its shaft closes a contact 27. The result of this, as will be explained more fully in connection with the diagram in Fig. 16, is to energize a series of solenoids or electro-magnets 28 and swing latches 29 out of notches 30 of sliding frames 31 on brackets on the main frame. Each frame or slide 31 is equipped with rolls 32 and 33 which are rotatably but permanently mounted thereon at a constant distance apart inside the two strands of the usual feed belts 40 which are mounted on a freely swinging frame. The slide on which the rolls are mounted is continuously pressed forward by two springs 34. This slide is provided with a rod 35 which, through a bell crank 36, is operated by a rod 37 adapted to come into contact with a stop 38, as will appear later. The unlatching of the latch 29 leaves this free to move from the position shown in Fig. 8 to that shown in Fig. 9 and more in detail in Fig. 3. The roll 32 thus presses the strand of the feeding belts 40 on the inside toward the roll B and in fact into contact with it. These belts thus act on the outer side of the web W to force it against the pasted spots on the roll B.

At the point of contact the web W is uniformly supported all the way across by means of additional supports such as brushes 41 or free running roller 32 mounted on the frame 31 as shown in Figs. 5 and 6 especially. These brushes or other supports help support the web throughout its width and press it against the web roll B.

Just before making a paster the switch 24 is closed by hand to start the motor, and is held in that position by a latch 24a. This rotates the reel and forces the roll B forward taking the feeding belts and their frame to the position shown in Fig. 10. This opens the switch 24 and stops the motor. Also it causes the rod 37 to engage the stationary stop 38 (see dotted lines in Fig. 3) and the latch 29 reengages the slide 31 and holds it in the position shown in Fig. 1 ready to be operated again.

For the purpose of providing a self-regulated tension device I have shown the web as passing over a tension roller 43 mounted on a pair of pivoted arms 44 at opposite ends. Each of these arms is provided with a spring-pressed rod 45 slidingly mounted in two perforated studs 46 with a spring for holding it in neutral position. The arm on one side is provided with contacts 47 and 48 connected with forward and reverse electric motor circuits.

This spring seated tension roller may yield to a suddenly applied pull on the web which tends to tighten it and likewise provides take-up for a sudden slacking of the pull of the web which tends to loosen it. The tightening and loosening is compensated for by moving away from or toward the feeding belts so as to produce more or less tension as may be required. When the arms 44 carrying the tension roller are moved beyond a predetermined point by the tightening or loosening of the web, one set of contacts will be closed. The contacts 47 and 48 are so connected with the line as to cause the motor 15 to rotate in a clockwise or counter-clockwise direction, thereby rotating the reel in such a way that the arm carrying the running roll will move toward or away from the feeding belts 40. This overcomes the condition which originally caused the tension roller 43 to move toward one of its contacts. This produces an automatic tension device which will right itself by its own action when the tension gets either too high or too low.

When the exhausted web roll has been severed from the running web the butt or stub of course remains on the reel rotating on its axis by the force of momentum. I have provided means for stopping its free rotation intimately connected with the means for severing the running web from this stub.

Referring now to Figs. 11 to 15 inclusive, the means for stopping the butt which I have illustrated, is an electric clutch. This clutch has a magnet member 51 which is rigidly fastened to the end of the spindle 52 upon which one end of the roll is mounted at 53. When the magnet portion 51 is energized in any way it draws toward it the friction member 54 of the clutch. This member is yieldingly mounted on the frame work of the arms of the reel on which the roll is mounted. This yielding means comprises a stationary arm 55 having guides for a spring rod 56. This spring rod is mounted in a tangential position with reference to the brake drum and is provided with a spring 57. The rod is pivotally connected with a cam section 59 which is a part of a yielding plate 63 on which the friction plate 54 is mounted to rotate therewith. This cam section is so placed that the spring normally holds a cam roller 60, rock arm 61, operating rack 61a, and severing knife 62 in line with the roll carrying arm of the reel and therefore out of the way. When, however, the magnet member 51 is energized it exerts a pull against the friction plate 54 which moves toward it. The rotation of the stub or butt of the roll with the energized clutch member 51 tends to take with it the friction clutch member 54, plate 63, and cam 59. The rotation of the latter compresses the spring 57 and causes the rod 56 to assume the position shown in full lines in Fig. 14. At the point shown in that figure the friction plate is brought to a positive stop by the fact that the end of the cam section 59 comes into contact with the head of an adjusting screw 64 on the stationary arm 55. This obviously prevents the butt from rotating further.

This motion also has another effect as it moves the cam 59 and therefore the rod 61 to cause the severing knife 62 to move out from its position along the arm of the reel into the position shown in Fig. 11. In this position it severs the edge of the web nearest to it at the moment of bringing the butt to a standstill. The rotating magnet 51 is provided with the commutator 25 which is rigidly mounted on the spindle 52 between the two bearings. Suitable wires are connected across from these bearings to the magnet 51.

The brushes 70 of the central sectional commutator 65 are fastened in stationary position to a plate 68 loosely mounted on the shaft of the reel 10. They are kept from rotating by a weight 69 which is a part of the plate 68. This commutator has brushes 70 thereon, three of which are shown in Fig. 15 but four of which are actually employed as will be seen by reference to Fig. 16. These brushes 70 feed current from the wires attached thereto to several segmental commutator plates 72 fastened to a plate 71 which is made of non-conducting material. This plate rotates with the reel concentrically. The commutator plates are connected with the several electrical devices on each of the arms of the reel by suitable wires as indicated in Fig. 16.

The wiring diagram for the various electrical connections is shown in Fig. 16. The current is supplied through a pair of mains $L_1$ $L_2$ as usual. Just before making a paster, the switch 24 is placed by hand in the position shown in this figure. It is held in that position by a latch or spring construction so that it will not be moved out of it except by the exercise of a little force. When the fresh web roll B moves around with the reel into position for it to contact with the spoon member of the switch 24, that turns the switch to break the contact at the point indicated in Fig. 16, and swings it around to the opposite position to make the contact at the opposite side of the switch. The breaking of the contact on one side interrupts the circuit to the reel motor 15 through the closed contacts 123 and stops the reel and, therefore, the further movement of the roll B in that direction for the time being. The making of the contact on the other side of the switch 24 connects up another circuit through solenoids 76 and 73 to the solenoid 28, which, at the time, is broken by the sectional commutator 25 on the roll B. When this roll B rotates around on its own axis to the proper pasting position, the contact 27 is closed thereby, thus automatically energizing the solenoid 28 on the frame which supports the feed belts. This circuit passes through one of the commutator plates 72 and is parallel with the circuit in which is located the hold in relay 73. This releases the latch and the springs force the frame and belts over into the position shown in Fig. 3. As the commutator 25 connects the circuit only momentarily, I provide a hold-in relay 73 for preventing the deenergization of the solenoid 28 during several complete rotations of the roll B and hold it until such time as the entire circuit is again functioning.

The sectional commutator 25, upon its next rotation causes the contact to be made with the contactor 74, as it does during each rotation. This energizes the electric coil member 51 of the brake on the spindle of the butt 52, the operation of which has been described above. As the contact between the sectional commutator 25 and the contactor 74 is likewise momentary, a hold-in relay 75 is provided to maintain a current in the clutch member 51 in spite of the break in the current member by the commutator 25.

When the web has been severed from the butt, a short time should elapse before the current is reestablished automatically in the reel motor 15 to cause the reel to rotate slowly and eventually bring the new roll into contact with the feeding belts. This is done by the simultaneous energization of a time relay 76 which operates to reestablish the current broken by the operation of the web so as to operate the reel. This time relay is an ordinary relay equipped with suitable retard devices so that a short space of time will elapse between the energizing of the coil and its complete functioning.

The reel motor can be reversed, if desired, by the closing of control marked "Reverse" while the "Forward" contacts are open. The closing of the "Reverse" switch energizes a solenoid 120 and closes contacts 121, thus reversing the circuit through the motor 15. The normal forward course of the current is controlled by energizing a solenoid 122 by closing the "Forward" contacts. This causes contacts 123 to close.

Current is fed to each of the three arms constituting one end of the reel by the sectional commutator 65 at the center of the reel. The construction of this commutator is described above as such that the mechanism on one arm of the three, and no other, will be affected by the make-and-break action of the several electric devices. As stated before, the brushes 70 are fixed to the plate 68 which is loosely mounted on the shaft of the reel and does not rotate. The several contacts feed current from the wires shown to one of the several segmental commutators 25 on the several arms.

In Figs. 18 and 19 the method of adjusting the rolls on the reel, independently of each other, is shown. In this case the shaft 11 has mounted upon it, in fixed position, a pair of hubs 80. On these hubs are slidably mounted three segmental supports 81 which together constitute a ring surrounding the hub. These supports are held on the links slidably by undercut ways and guides 79. Through one of these supports passes a screw 92 which extends into, or is connected with, another screw 93 extending into, the other support 81. The head of the screw is provided with a reduced neck fitting in a projection on the hub 80, and is provided also with a head 94. Obviously by turning the screw 92 by this head that particular pair of supports 81 will be shifted along the shaft 11. This is for adjustment. These supports 81 are provided with bearings for carrying the studs 95 on which the roll B, or any other roll, is mounted. Each of these rolls, therefore, can be adjusted separately in this manner.

In the form shown in Fig. 17 the screws 92 and 93 are eliminated and the supports 96 are integral with the hubs, that is the parts corresponding to the parts 80 and 81 are all in one piece. In this case there is a screw 97 which can be turned by its head 98 to cause the roll B to move sideways with respect to the press against the resistance of a spring 99 on the stud 95 at the other end. This carries with it a collar 100 which moves in a bearing in the support 96 at that end. A screw 101 is located in position to hold the roll B in its adjusted position. In either of these ways the rolls can be adjusted individually to line up the new roll B with the running web, and the new roll can be adjusted independently of the other two and held in adjusted positions.

The invention can be carried out in other ways. In Figs. 20 and 21 I have shown a modification of the means for pressing the web against the fresh roll which can be substituted for the one shown in Fig. 1, either in connection with the other features shown in this application or not as may be desired.

In this case the feeding belts 40 are mounted on pulleys or rolls at two ends as before, those at one end on a pivot shaft 103. The hanger for these feeding belts comprises a member 104 pivoted on that shaft and a member 105 carrying the other pulleys or roll. These two members of the hanger are pivoted together by a pivot shaft 106, and on this shaft are mounted pulleys 107 engaging the belts. An adjustment 108 is also shown for an obvious purpose.

The hanger 104 carries a shaft or stud 109 across it on which is a lever 110 provided with a latch 111 at one end. The other arm 114 of this lever is connected with the movable element of the solenoid 28 which is connected up and works in the same manner as the solenoid 28 in Fig. 1. When this solenoid is excited it draws back the arm 114 from the position shown in Fig. 20 to that shown in Fig. 21 and disengages the latch 111 from an abutment 113 which is located on the hanger 105. The result of this is that a spring 115 which connects the pivot shaft 109 with the hanger 105 pulls this hanger back about the pivot 106 to the position shown in Fig. 21.

It will be noticed that a pair of levers 116 are forced by a spring 112 to swing in a certain direction. The other ends of these levers have a shaft carrying rolls 117 which normally press against the feeding belts. These take up the slack when the latch is released, as shown in Fig. 21. It will be understood that as there are several feeding belts parallel with each other these rolls 117 are employed for each one.

The belt hanger is reset to the position shown in Fig. 1 by the rotation of the reel subsequent to the making of the paster. This pushes the hangers out beyond the position shown, about the shaft 103 as, of course, the feeding belts are moved out by the roll B turning around to the position of the roll A. When moved out to an inclined position the weight of the hanger 105 projecting entirely out beyond its pivot 106 will overcome the pull of the spring 115 and straighten out. The spring 112, of course, forces the latch over to lock it to the abutment 113. The parts will assume this position as the feeding belts swing back toward the position shown in Fig. 21 and return. They will remain in the same relative position until the latch is again released by the operation of the solenoid.

In either of the forms shown the advantage mentioned at the beginning of this specification are secured in a comparatively simple way; the machine is automatically operated throughout, except for the setting of the switch 24; the parts are of a nature not likely to get out of order easily, and they are comparatively lacking in complication.

Although I have illustrated and described only two forms of the invention I am aware of the fact that other changes can be made therein by any person skilled in the art without departing from the scope of the invention as expressed in the claims. Therefore, I do not wish to be limited to the exact forms shown, but what I do claim is:—

1. In a web splicing mechanism, the combination with means for supporting a movable web roll, means for rotating it up to web speed, feeding belts for the web roll, and means for moving one strand of the feeding belts up to the fresh web roll for splicing the old web to the web on the fresh roll.

2. In a quick change splicing device for a printing press, the combination with means for supporting a running roll and a fresh roll for the web, of means running at a constant speed for pressing against the two rolls at different points on its periphery to press the web against the fresh roll, said means being connected with the press to be operated thereby, and means for moving said roll engaging means toward the fresh roll at the time of splicing.

3. In a web splicing device, the combination with means for supporting fresh and running rolls, of feeding belts for the running web roll, means for bringing the feeding belts into a position to press the running web into contact with the pasted fresh roll for splicing, and a latch mechanism for normally holding the feeding belts away from the fresh roll.

4. In a web splicing device, the combination with means for supporting fresh and running rolls, of feeding belts for the running web roll, means for bringing the feeding belts into a position to press the running web into contact with the pasted fresh roll for splicing, and a latch mechanism for normally holding the feeding belts away from the fresh roll, located in position to be latched by the motion of the fresh roll into running position.

5. In a web splicing device, the combination with means for supporting movably mounted running and fresh web rolls, of feeding belts for the running web, means for pressing one strand toward the fresh roll, yielding means for normally moving that strand in said position, a latch in position to hold back the strand pressing means, and means operated by the rotation of the spare roll on its own axis for releasing the latch.

6. In a web splicing device, the combination with means for supporting movably mounted running and fresh web rolls, of feeding belts for the running web, means between the strands of said belts for pressing one strand toward and against the fresh roll, yielding means for normally moving that strand in said position, a latch in position to hold back the strand pressing means, and means operated by the rotation of the spare roll on its own axis for releasing the latch, automatically, when the spare roll rotates into position for splicing.

7. In a web splicing mechanism, the combination with means for guiding the running web, of a feeding belt for engaging the web and controlling its speed, a slide, two rolls on the slide each engaging the inner surface of one strand of the belt, a latch for normally holding the slide back, a spring tending to force the slide forward to project one strand of a belt toward the web and deflect it out of its normal path, means for operating the latch to release the slide, and means whereby the motion of the belts backwardly as a whole will draw back the rolls to a point at which the latch will again hold the slide back.

8. In a web splicing mechanism, the combination with means for guiding the running web, of a feeding belt for engaging the web and controlling its speed, a sliding frame, two rolls on the frame at a constant distance apart each engaging the inner side of one strand of the belt, a latch for normally holding the slide back, a spring tending to force the slide forward to project one strand of a belt toward the web and deflect it out of its normal path, and means for operating the latch to release the slide.

9. In a web splicing device, the combination with means for supporting a running and a spare web roll, means for moving said support to bring the fresh roll into running position, means for automatically stopping the moving means when the fresh roll has moved to a predetermined position, feeding belts constantly acting on the running web roll, means for rotating the fresh roll on its axis, and means for automatically moving the feeding belts toward the fresh roll for splicing when the fresh roll has rotated to the proper point for pasting.

10. In a web splicing device, the combination with a set of feeding belts for the running web roll, of a hanger having pulleys mounted at the ends thereof for guiding said belts, pulleys in contact with the inner sides of the strands of the feeding belts toward the web, and means for automatically moving said last mentioned pulleys further toward the web at the time of pasting.

11. In a web splicing device, the combination with a set of feeding belts for the running web, of a hanger having pulleys mounted at the ends thereof for guiding said belts, pulleys in contact with the inner sides of the strands of the feeding belts toward the web, means for automatically moving said last mentioned pulleys further toward the web at the time of pasting, and means whereby when the fresh web roll moves around into running position it will push the feeding belts and their hangers backward and automatically restore the feeding belts to their original position.

12. In a web splicing device, the combination with means for supporting and moving a fresh roll and a running roll, a pivoted hanger, pulleys at the top and bottom of said hanger, feeding belts on said pulleys for feeding the running web, means whereby when a fresh roll rotates around to pasting position the adjacent strands of the feeding belts will be moved toward the fresh web roll, a latch arrangement for normally holding said strand in normal position, a rod connected with the latch arrangement, and an abutment in position for being engaged by the rod when the fresh roll is moved around to running position and moves the hanger with it, thereby releasing the latch.

13. In a web splicing device, the combination with a feeding belt for engaging the web and feeding it along, a roller in position for engaging the belt at the rear thereof to press it toward a fresh web roll, and supports located in alignment with the said roll across the web for supporting the web all the way across at the instant of pasting and at the instant of engagement with the fresh web roll.

14. In a web splicing device, the combination with a reel having a series of pairs of arms for supporting a plurality of web rolls, each arm having a spindle thereon provided with means for engaging the center of the web roll, a magnetic brake connected with said spindle in each case, means for energizing the brake to stop the spindle of an expiring web roll, said means comprising a cam, a slitting knife, and means connected with the cam for operating the slitting knife when the brake is applied.

15. In a web splicing device, the combination with a reel having a plurality of sets of arms, spindles on the several arms for supporting the web rolls, a magnetic brake for each of said spindles, means for energizing the magnetic brake when the web running therefrom has been pasted to a fresh web roll, said brake having an arm projecting therefrom, a spring-pressed rod on the arm, a cam adapted to be oscillated about the center of the spindle, a pivotally mounted slitting blade, and means connected with said cam for actuating the slitting blade when the brake is applied.

16. In a web splicing device, the combination with the web roll and means for braking the roll, of means for severing the web controlled by the roll braking means.

17. In a web severing device, the combination with a rotatable expiring butt, of means operated by the rotation of the expiring butt for severing the web.

18. In a web splicing device, in combination, a butt brake, a severing knife, and means operated by the butt brake for operating the severing knife to sever the web.

HENRY A. WISE WOOD.